United States Patent
Okada et al.

(10) Patent No.: US 8,082,779 B2
(45) Date of Patent: Dec. 27, 2011

(54) MASTER TIRE AND METHOD OF INSPECTING TIRE UNIFORMITY TESTER USING THE MASTER TIRE

(75) Inventors: Toru Okada, Kobe (JP); Koichi Honke, Kobe (JP)

(73) Assignee: Kobe Steel Ltd, Hyogo (JP)

( * ) Notice: Subject to any disclaimer, the term of this patent is extended or adjusted under 35 U.S.C. 154(b) by 0 days.

(21) Appl. No.: 12/737,540

(22) PCT Filed: Jun. 30, 2009

(86) PCT No.: PCT/JP2009/062013
§ 371 (c)(1), (2), (4) Date: Jan. 24, 2011

(87) PCT Pub. No.: WO2010/010798
PCT Pub. Date: Jan. 28, 2010

(65) Prior Publication Data
US 2011/0113875 A1  May 19, 2011

(30) Foreign Application Priority Data
Jul. 25, 2008 (JP) .................................. 2008-192185

(51) Int. Cl.
*G01M 17/02* (2006.01)
(52) U.S. Cl. .......................................... 73/146
(58) Field of Classification Search .................. None
See application file for complete search history.

(56) References Cited

U.S. PATENT DOCUMENTS

| | | | | |
|---|---|---|---|---|
| 4,423,632 A * | 1/1984 | Madden et al. | | 73/462 |
| 5,614,676 A * | 3/1997 | Dutt et al. | | 73/660 |
| 6,035,709 A * | 3/2000 | Barnette, Jr. | | 73/146 |
| 6,321,809 B1 | 11/2001 | Buenger et al. | | |
| 6,651,716 B1 * | 11/2003 | Brown et al. | | 152/564 |
| 2006/0272408 A1 * | 12/2006 | Matsumoto | | 73/462 |

FOREIGN PATENT DOCUMENTS

| | | |
|---|---|---|
| JP | 1066536 A | 3/1989 |
| JP | 2004-150894 | 5/2004 |
| JP | 2005-069885 | 3/2005 |

(Continued)

OTHER PUBLICATIONS

International Search Report for Application PCT/JP2009/062013 mailed Aug. 4, 2009.

(Continued)

*Primary Examiner* — Andre Allen
(74) *Attorney, Agent, or Firm* — Stites & Harbison PLLC; Juan Carlos A. Marquez, Esq.

(57) ABSTRACT

The present invention provides a master tire for inspecting the accuracy of a tire tester easily and securely. A master tire 100 according to the present invention is equipped with an upper-lower rim member 120, a cylindrical member 110 equivalent to the tread portion of a tire, and leaf spring 130 secured to the cylindrical member 110 and the rim member 120 with bolts 140 and bolts 142. A spindle 21 is secured to the rim member 120 so that the center axis thereof is not displaced. The rim member 120 is vertical to or slightly inclined with respect to the spindle 21. The cylindrical member 110 is made of a metallic material, such as iron or aluminum, or a hard plastic having stable characteristics.

16 Claims, 9 Drawing Sheets

FOREIGN PATENT DOCUMENTS

JP          2005-326185         11/2005

OTHER PUBLICATIONS

Extended European Search Report Communication issued Jul. 6, 2011 in the corresponding European Patent Application No. 09800313.0-1236 / 2314999 PCT/JP2009062013 (5 pages).

Korean Intellectual Property Office Notice of Preliminary Rejection issued on Jun. 2, 2011, in the corresponding Korean Patent Application No. 10-2011-7004499 (3 pages) including an English language translation (2 pages).

* cited by examiner

POSITION OF CYLINDRICAL MEMBER
HAVING NO INCLINATION

MISALIGNMENT OF AXIAL CENTERS (A)

(B)

MASTER TIRE AND METHOD OF INSPECTING TIRE UNIFORMITY TESTER USING THE MASTER TIRE

TECHNICAL FIELD

The present invention relates to a master tire (reference tire) and to a method for inspecting a tire uniformity tester using the master tire.

BACKGROUND ART

Conventionally, in the processes of producing ordinary rubber pneumatic tires (hereafter simply referred to as tires), tires having been finally completed through a vulcanization process are subjected to an appearance inspection and a uniformity test, and tires having passed these inspections are shipped. In this kind of uniformity test, for example, a tire to be tested is mounted on the rim body of the mounting rim of a tester, air is filled into the tire at a predetermined pressure from a gas filling portion installed in the rim body, and a characteristic measurement test is carried out.

For example, a tire uniformity tester is used for this characteristic measurement test. In the characteristic measurement test, in a state in which a predetermined load is applied to a tire mounted on a rim so that the tire is pressed against a rotation drum, the distance between a spindle and a drum shaft is fixed and the tire is rotated, force variations generated in the tire are measured. These force variations are mainly three variations, that is, a force variation in the radial direction of the tire (radial force variation, hereafter referred to as RFV), a force variation in the lateral direction of the tire (lateral force variation, hereafter referred to as LFV) and a force variation in the tangential direction of the tire (tractive force variation, hereafter referred to as TFV).

For the purpose of measuring these force variations, a method in which the drum shaft is driven by driving the spindle or a method in which the spindle is driven by driving the drum shaft is used usually as a driving method. Furthermore, as the measurement locations of the force variations, there is a case in which the measurement is carried out at the drum shaft and a case in which the measurement is carried out at the spindle. The force variations generated in the tire are mainly caused by non-uniformity in hardness and thickness of rubber and depending on circularity. The measured load is subjected to frequency analysis and tracking analysis, and only the rotation speed components and harmonic components of the tire are extracted.

The load to be applied to the tire is several hundred kgf in the case of the tire of a passenger car. The rotation speed of the tire is specified at 60 rpm in the case of low-speed uniformity (JIS-D4233, 2001), and the RFV and the LFV are mainly measured.

In a general measuring apparatus, the entire performance of the measuring apparatus is checked with reference to a test piece having known values (for example, the prototype kilogram in the case that the general measuring apparatus is a weight measuring apparatus); however, such checking is impossible in the case of this kind of tire uniformity tester. The reason for this is that there is no tire whose force variations are completely known.

This is because the characteristics of the tire changes due to degradation caused by the effect of temperature and repeated use. Hence, although the accuracy of an arithmetic unit inside the measuring apparatus can be checked by inputting an electrical simulation signal, even if an attempt is made to examine measurement errors due to mechanical factors, since reference input itself does not exist, it is very difficult to inspect the accuracy of the entire apparatus.

Accordingly, as disclosed in Patent Reference 1, the accuracy of the entire system of the tire uniformity tester is inspected by using a statistical method based on numerous tire data obtained by carrying out sequentially repeated measurements an appropriate number of times and by confirming whether the range of data variation is limited to a predetermined value or less. Conventionally, on the basis of totally 100 pieces of data obtained by subjecting 10 tires to sequentially repeated measurements carried out 10 times, a dispersion analysis in a two-way layout with two factors, i.e., a factor among tires and a factor among the number of measurement times, is carried out to confirm that the standard deviation values of residual errors (experimental errors and measurement errors) are within specified ranges. This kind of test is referred to as a 10×10 test (ten by ten test).

CITATION LIST

Patent Reference

Patent Reference 1: JP-A-64-66536

SUMMARY OF THE INVENTION

Problems that the Invention is to Solve

However, the technology disclosed in the above-mentioned Patent Reference 1 has the following problems.

First, the 10×10 test according to Patent Reference 1 takes a long test time and may cause measurement errors since numerous experiments are carried out. In addition, the operator suffers from significant physical and mental fatigue.

Furthermore, in the method for inspecting the accuracy of the tire uniformity tester disclosed in Patent Reference 1, data dispersion is analyzed using actual tires (data reproducibility is confirmed); hence, the method is different from a method in which the absolute reliability of measured loads is evaluated. Moreover, since actual tires are used, the characteristics thereof are significantly affected by the change in temperature, whereby it is difficult to securely obtain the stability of the characteristics.

Still further, there is a problem of fitting as one factor causing measurement errors in the uniformity tester. Since the mounting of the tire on the rim is merely carried out by using only the force applied at the time of filling air to attain internal pressure, the tire does not fit sufficiently on the rim in some cases depending on the state of the bead portion of the tire. In this kind of state, the measured value of the RFV or the LFV has an error and a variation. Hence, even in a situation in which the standard deviation value becomes large as the result of the above-mentioned 10×10 test, it is impossible to judge whether the tester itself has a problem or the filling between the tire and the rim has a problem.

In view of the above-mentioned problems, the present invention is intended to carry out the accuracy inspection of the tire uniformity tester easily and securely. The present invention provides a reference tire (master tire) which has stable characteristics and to which known RFV and LFV can be set, instead of the conventional rubber pneumatic tire and also provides an accuracy inspection method using the master tire.

Means to Solve the Problem

In order to solve the problem, according to the present invention, there is provided a master tire for inspecting a measurement accuracy of a tire uniformity tester equipped with a spindle on which a tire is mountable and a drum mechanism for pressing a rotatable drum against the outer circumference of the tire, including: a rim member installed on the spindle; a cylindrical member made of a material having elastic characteristics more stable than those of a vulcanizate and simulating the tread portion of the tire; and a plurality of elastic members made of a material having elastic characteristics more stable than those of the vulcanizate and distributed and provided between the cylindrical member and the rim member in the circumferential direction of the cylindrical member.

Hence, since the change in the characteristics due to the effects of environmental conditions, such as temperature, or due to the effects of degradation after many times of use does not occur, unlike the case of the actual rubber tire (vulcanizate), it is possible to obtain a master tire having stable characteristics and generating known RFV and LFV. With this master tire, the accuracy inspection of the tire uniformity tester can be carried out accurately and securely.

Further, according to the present invention, there is provided a master tire for inspecting a measurement accuracy of a tire uniformity tester equipped with a spindle on which a tire is mountable and a drum mechanism for pressing a rotatable drum against the outer circumference of the tire, including: a pair of upper and lower rim members installed on the spindle; a plurality of elastic connection members for connecting the pair of upper and lower rim members; a cylindrical member made of a material having elastic characteristics more stable than those of a vulcanizate and simulating the tread portion of the tire; and a plurality of elastic members made of a material having elastic characteristics more stable than those of the vulcanizate and distributed and provided between the cylindrical member and the rim member in the circumferential direction of the cylindrical member.

Hence, since the change in the characteristics due to the effects of environmental conditions, such as temperature, or due to the effects of degradation after many times of use does not occur, unlike the case of the actual rubber tire (vulcanizate), it is possible to obtain a master tire having stable characteristics and generating known RFV and LFV. With this master tire, the accuracy inspection of the tire uniformity tester of a vertically divided rim type can be carried out accurately and securely.

Further, according to the master tire of the present invention, preferably, the cylindrical member and the elastic members are made of materials having aging characteristics more stable than those of the vulcanizate.

Further, preferably, the elastic members include leaf springs made of a metal. In particular, the degree of freedom in the rigidity characteristics of the master tire in the radial direction and the lateral direction increases by using the leaf springs.

Besides, according to the above master tire, preferably, the plurality of elastic members have rigidities different in the circumferential direction.

Hence, a desired RFV can be generated in the master tire. The rigidity of the elastic members can be changed easily by changing the thickness thereof.

More preferably, the center axis of the cylindrical member is inclined with respect to the spindle.

Theoretically speaking, if the axial center of the cylindrical member is aligned with the axial center of the spindle, no load is generated in the lateral direction of the tire. If the axial center is inclined, a moment is generated so that the axial center of the cylindrical member becomes parallel with the axial center of the spindle when the master tire is pressed against the drum, and a load is generated in the lateral direction of the tire by the moment. The direction of the moment is changed as the tire is rotated, and the change appears as the LFV. As the inclination angle of the cylindrical member becomes larger, the LFV to be generated increases. In other words, the master tire according to the present invention can generate a desired LFV.

On the other hand, according to the present invention, there is provided a method for inspecting a tire uniformity tester, wherein the measurement accuracy of the tire uniformity tester is inspected using the above master tire.

Hence, it is possible to carry out the measurement accuracy inspection while being hardly affected by the effects of external environment, such as temperature, and while being less affected by the change with time due to repeated use. In addition, since the master tire can be installed accurately in the tire uniformity tester, a measurement accuracy inspection free from the effects of fitting can be carried out.

Specifically, it is prefer to inspect the measurement accuracy on the basis of the results of measurements carried out while the phase relationship between the master tire and the spindle is changed at least twice.

It is possible to carry out an accuracy inspection test equivalent to or better than the 10×10 test that uses the conventional pneumatic tires by using the average values and the standard deviation values of the RFV and the LFV obtained from the measured values of measurements carried out at least two times.

Furthermore, it may be possible that the force variation (static RFV) in the radial direction of the above-mentioned master tire and the force variation (static LFV) in the lateral direction of the above-mentioned master tire at the time when a static load is applied to the above-mentioned master tire are obtained, and that the above-mentioned measurement accuracy is inspected on the basis of the above-mentioned static RFV and the above-mentioned static LFV.

In particular, since the rotation speed of a low-speed tire uniformity tester is low, 60 rpm, it is assumed that the tester is less influenced by dynamic effects, such as centrifugal force. Hence it is preferable that the characteristics of the master tire are obtained by a static test and the measurement accuracy of the tire uniformity tester is evaluated on the basis of the values.

EFFECTS OF THE INVENTION

With the master tire according to the present invention, the change in the characteristics due to the effects of environmental conditions, such as temperature, or due to the effects of degradation after many times of use does not occur, and known RFV and LFV can be generated stably. With this master tire, the accuracy inspection of the tire tester can be carried out accurately and securely.

BRIEF DESCRIPTION OF THE DRAWINGS

FIG. 6(A) is a view showing the configuration of the master tire, and FIG. 6(B) is a graph showing an example in which the master tire is analyzed using FEM;

MODES FOR CARRYING OUT THE INVENTION

Figure 1:
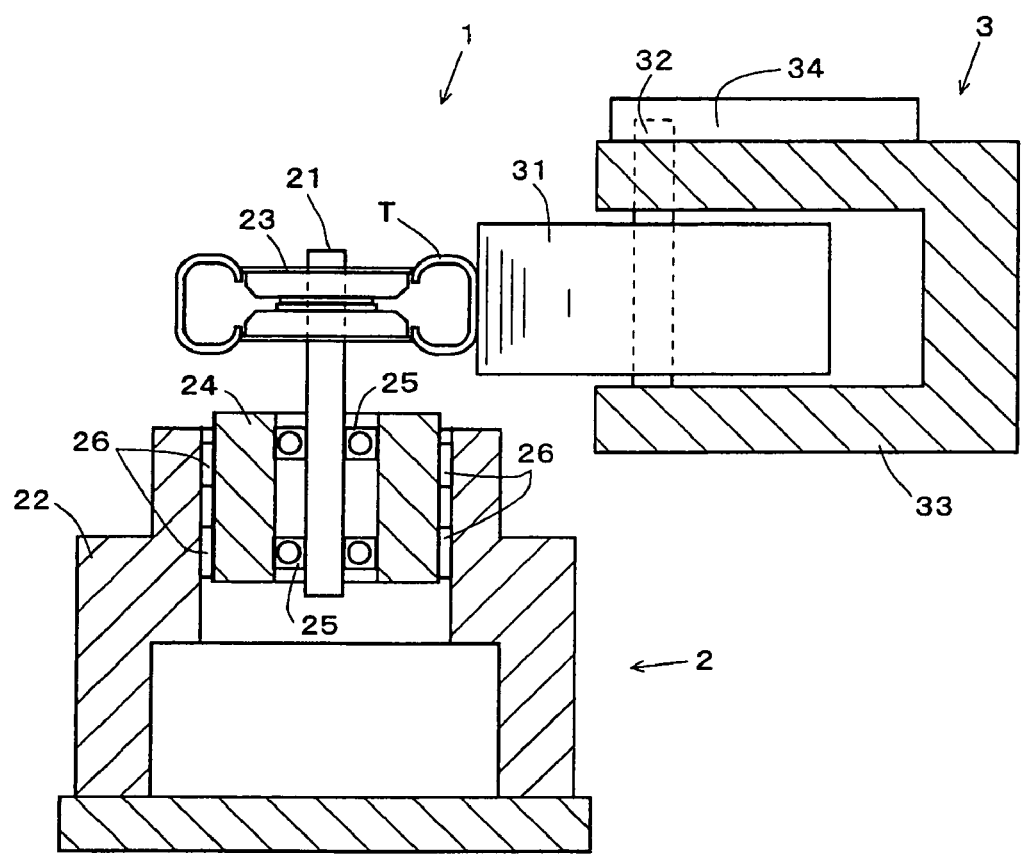
FIG. 1 is a view showing the entire configuration of a tire tester subjected to accuracy inspection using master tires according to a first embodiment and a second embodiment.

Embodiments according to the present invention will be described below on the basis of the drawings.

In the following descriptions, the same components are designated by the same reference characters. Their names and functions are the same. Hence, their detailed descriptions are not repeated.

First Embodiment

First, a tire uniformity tester (hereafter referred to as a tire tester) for carrying out accuracy inspection using a master tire according to this embodiment will be described.

In the tire tester described below, accuracy inspection is carried out using the master tire according to the first embodiment and a master tire according to a second embodiment.

As shown in FIG. 1, this tire tester 1 is equipped with a tire rolling device 2 on which an actual tire T or a master tire 100 can be mounted and a drum device 3 disposed on the side of the tire rolling device 2.

The tire rolling device 2 is equipped with a spindle 21 extending in the vertical direction and a support member 22 for rotatably supporting the spindle 21. A rim 23 on which the tire T is mounted can be disposed at the upper end portion of the spindle 21. The tire T can be mounted on the tire rolling device 2 by mounting it on this rim 23. The spindle 21 is accommodated in a bearing housing 24 in a state in which the upper end portion thereof protrudes. In addition, the spindle 21 is supported by the bearing housing 24 via a pair of upper and lower bearings 25 in a state in which the axial center thereof is aligned with the axial center of the bearing housing 24.

The drum device 3 is equipped with a cylindrical rotation drum 31 having a substitute road surface member on the outer circumferential face thereof; a rotation drum shaft 32 installed along the axial center of the rotation drum 31; a frame 33 for rotatably supporting the rotation drum shaft 32; and a drive device 34 for rotating the rotation drum 31 by applying a rotation force to the rotation drum shaft 32. A plurality of load cells 26 are provided between the support member 22 and the bearing housing 24.

Next, the master tire according to the first embodiment, for use in the accuracy inspection of the above-mentioned tire tester 1, will be described.

FIG. 2(A) is a sectional view showing the master tire 100 according to this embodiment. FIG. 2(B) is a top view of thereof.

Figure 2:
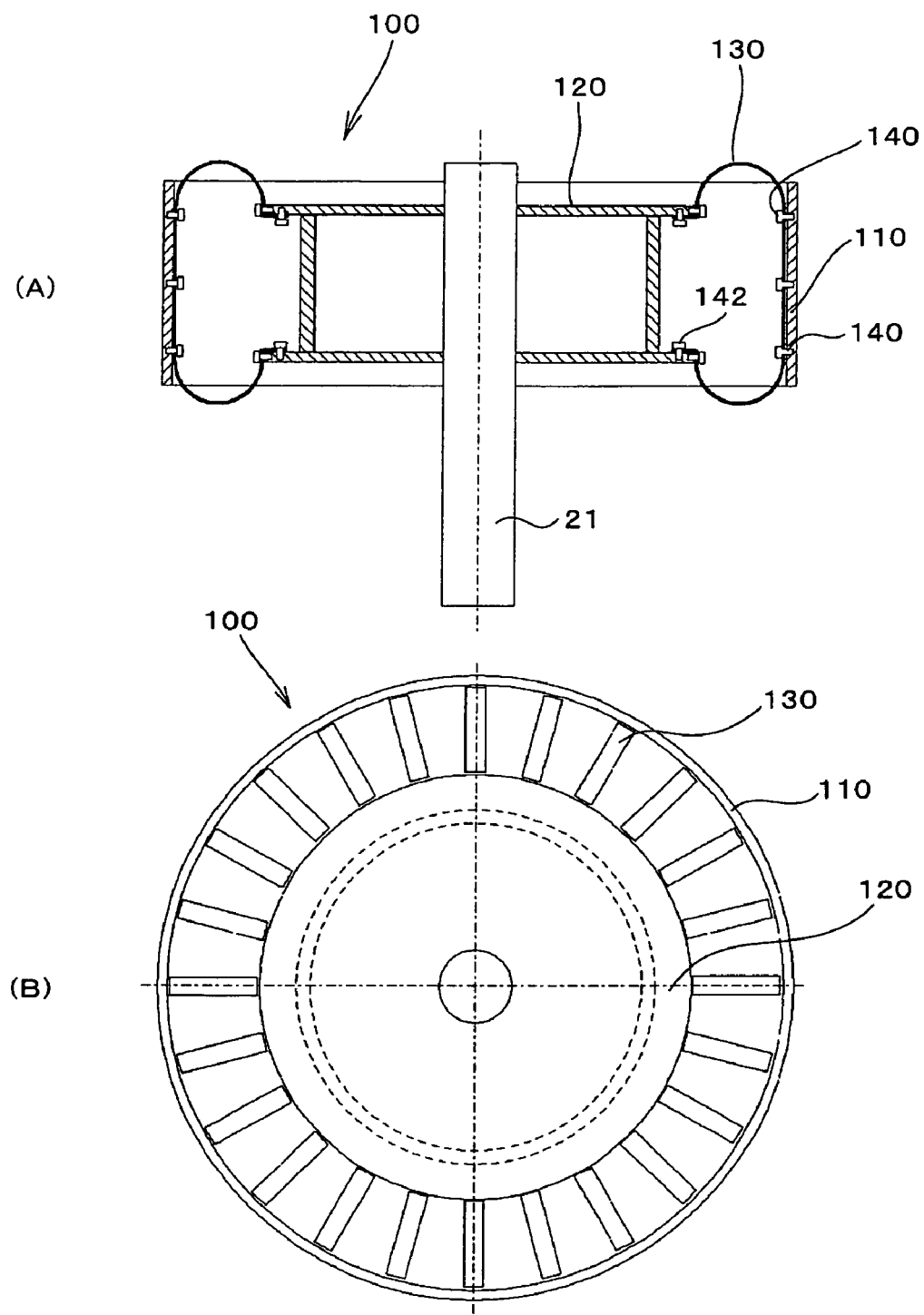
FIG. 2 is a view showing the configuration of the master tire according to the first embodiment.

As shown in FIG. 2, the rim member 120 of the master tire 100 has a structure in which the upper and lower portions thereof are integrated. The master tire 100 is secured to and mounted on the tire tester 1 with high accuracy so that the center axes of the rim member 120 and the spindle 21 are not misaligned with each other and so that the spindle 21 is not inclined with respect to the rim member 120.

A cylindrical member 110 equivalent to the tread portion of a tire is held using leaf springs 130 curved convexly outward. The leaf spring 130 is secured to the cylindrical member 110 and the rim member 120 using bolts 140 and bolts 142, respectively. Metallic materials, such as iron and aluminum, and hard resins (such as hard plastics) having stable characteristics can be used for the cylindrical member 110.

The leaf spring 130 according to the embodiment is formed of a single spring member. One end of the leaf spring 130 is secured to the upper portion of the rim member 120 and protrudes outward, the middle portion thereof is disposed along the rear face of the cylindrical member 110 and secured thereto, and the other end thereof is secured to the lower portion of the rim member 120 and protrudes outward. However, the leaf spring 130 is not limited to have this shape and this installation structure. For example, the leaf spring 130 for connecting the upper portion of the rim member 120 to the upper portion of the cylindrical member 110 may be separate from the leaf spring 130 for connecting the lower portion of the rim member 120 to the lower portion of the cylindrical member 110. The leaf spring may also be configured so as to be bent convexly inward.

The elastic characteristics of rubber (vulcanizate) serving as a material of an actual tire will change due to the effects of environmental conditions, such as temperature, or due to the effects of degradation after many times of use. Since the master tire 100 is made of only a metal (iron, aluminum or the like) or a hard resin having stable characteristics, instead of rubber, the characteristics can be stabilized and known RFV and LFV can be generated. It is desirable that the spring constant, etc. of the leaf spring 130 disposed between the cylindrical member 110 and the rim member 120 of the master tire 100 should be set so as to become close to the rigidity of the tire T (pneumatic tire) to be inspected by the tire tester 1.

In the tire tester 1, the inter-axis distance between the rotation drum shaft 32 and the rotation axis (spindle 21) of the tire T is fixed to a distance at which the reaction force from the tire T reaches a desired load. In that state, the tire T is rotated and the variation of the generated load is measured. Hence, in the case of a structure of the master tire 100 in which no spring is used or the rigidity of the spring is excessively large, a large load variation (FV) occurs due to a slight axial runout between the rotation drum shaft 32 and the spindle 21 of the tire tester 1. The generated load is $F=k(\theta)\cdot(x+\Delta x)$, wherein $\theta$ is the rotation angle of the tire, $k(\theta)$ is the rigidity of the spring corresponding to the rotation angle of the tire, x is the amount of pressing ($\approx$inspection pressing load/k), k is the average value of the rigidity of the spring, and $\Delta x$ is the variation in the amount of pressing due to the axial runout or the like. If the value of $k(\theta)$ is larger than that of the actual tire T, the ratio of $\Delta x$ to the amount of pressing x increases relatively and excessive axial runout accuracy is required, whereby such a master tire is not suited as the master tire for accuracy inspection. Furthermore, it is desirable that the FV generated from the master tire 100 should also be approximate to that of a tire to be tested.

The FV is not generated under the conditions that the cylindrical member 110 is a complete true circle and the axial center thereof is aligned with the axial center of the spindle 21 and that the characteristics of the plurality of the leaf springs 130 disposed in the circumferential direction are completely the same. In actual practice, however, the FV is generated due to errors occurred during the production of the master tire and due to the unevenness in the characteristics of the springs.

Figure 3:
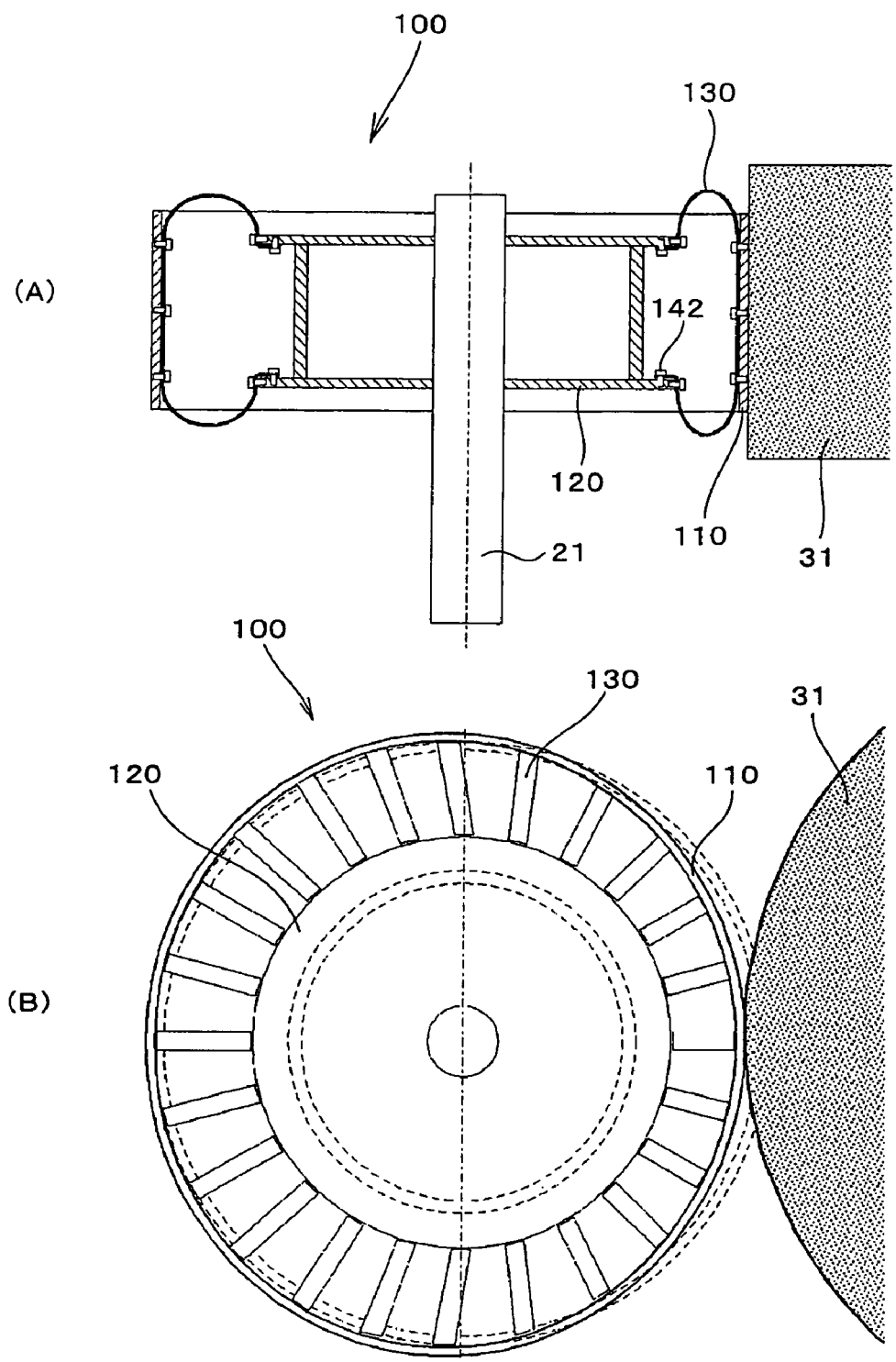
FIG. 3 is a view showing a state in which the master tire shown in FIG. 2 is pressed against a rotation drum.

FIG. 3 shows the deformed state of the master tire 100 when a load is applied from the rotation drum 31. FIG. 3(A) is a sectional view corresponding to FIG. 2(A), and FIG. 3(B) is a top view corresponding to FIG. 2(B).

If the cylindrical member 110 has a high rigidity, the cylindrical member 110 of the master tire 100 simply moves in the horizontal direction, only the leaf springs 130 are deformed, and a reaction force is generated. On the other hand, a deformation state close to that of the actual tire can be attained by adjusting the thickness of the cylindrical member 110 and by elastically deforming the cylindrical member 110. This arises from the fact that the deformation of the actual tire in an area other than the load application area is slight.

Although the bolts are used to connect the leaf springs 130 to the rim member 120 and the cylindrical member 110, in the case that it is not necessary to change the characteristics of the master tire 100, permanent connection methods, such as welding and bonding, may also be used. If slippage occurs at the connection portions due to the deformation of the master tire 100, variation occurs in the characteristics of the master tire 100 due to the hysteresis characteristics of friction; hence, it is necessary to prevent slippage at the connection portions.

As shown in FIGS. 2 and 3, two bolts are used for connection at the connection portions between the rim member 120 and the leaf spring 130. The leaf spring 130 is bent 90° and connected along the end faces of the rim member 120. As spring members for connecting the rim member 120 to the cylindrical member 110, coil springs or springs made of wires, other than the leaf springs 130, can also be used. The use of the leaf springs 130 is advantageous in that the rigidity of the spring can be adjusted relatively easily by changing the thickness, width and shape (curved portion) thereof. The design of this kind of leaf spring 130 has been described in formularies, provided that it, has a simple shape. However, since the deformation state of the leaf spring 130 is different depending on the position as shown in FIG. 3(B), a method for obtaining the deformation state using the FEM analysis can be carried out more simply and accurately.

The rigidity of the spring in the radial direction at the drum contact portion changes depending on the rotation angle of the tire by changing the rigidity of the plurality of springs in the circumferential direction. Since the tire spring 1 rotates the tire T in a state in which the inter-axis distance between the rotation drum shaft 32 and the spindle 21 is fixed, the change in the rigidity of the spring appears as a load variation in the radial direction, that is, the RFV. In addition, the circularity error of the cylindrical member 110 also appears as a load variation in the radial direction.

It is desirable that the circumference of the cylindrical member 110 making contact with the rotation drum 31 should be subjected to lining processing to prevent the surface of the cylindrical member 110 and the surface of the rotation drum 31 from being damaged. The lining member has an excellent abrasion resistance and a hardness not causing flaws on the rotation drum 31.

It is preferable that the lining member should follow the elastic deformation of the cylindrical member 110 and should not be separated from the cylindrical member 110. It is desirable that the lining member should be selectively made of a material having high strength and small change in characteristics, for example, a rubber material, such as urethane rubber or fluororubber, or a plastic material, such as acrylic resin, PET, fluororesin or PEEK (polyether ether ketone) resin. Furthermore, it is desirable that the lining should be as thin as possible so that the effects of the lining are suppressed to be minimal. Moreover, it is desirable that the lining member should have a large friction coefficient so that slippage does not occur between the lining member and the rotation drum 31.

Second Embodiment

Next, a master tire according to a second embodiment will be described.

In this embodiment, the same components as those according to the above-mentioned embodiment are designated by the same reference characters. Their functions are also the same.

Figure 4:
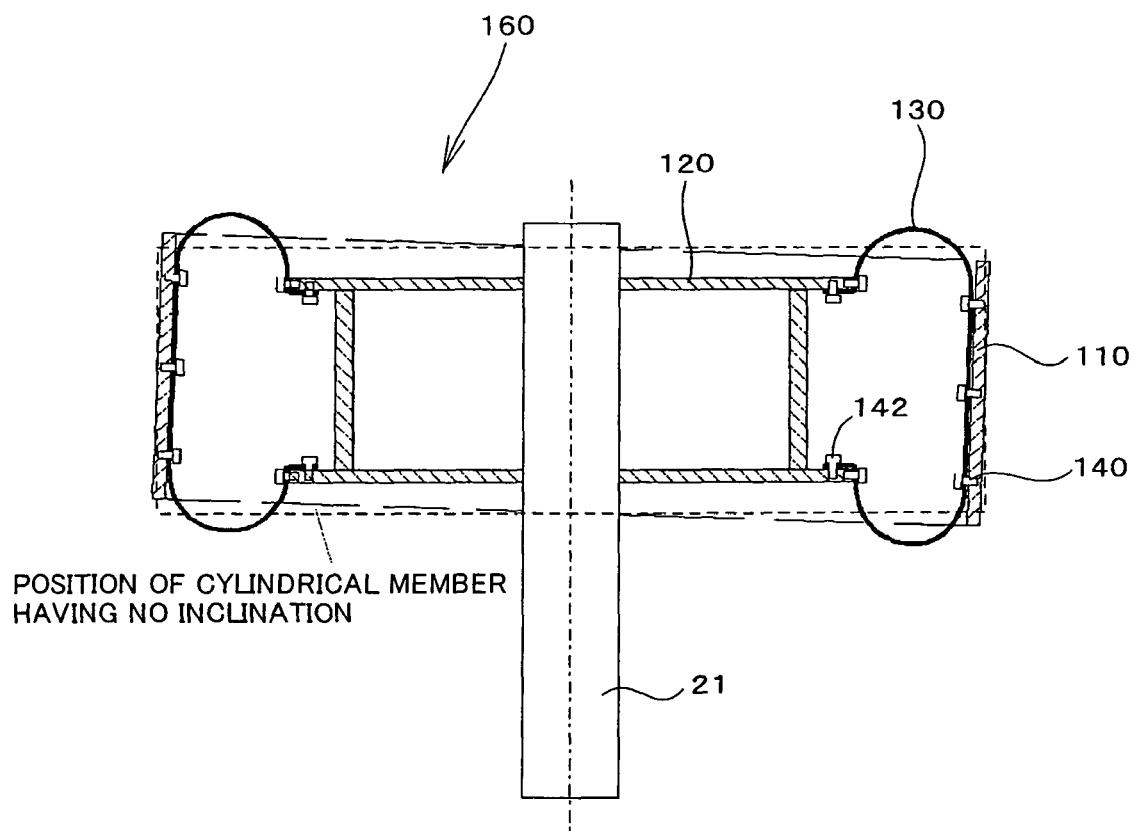
FIG. 4 is a view showing the configuration of the master tire according to the second embodiment.
Figure 5:
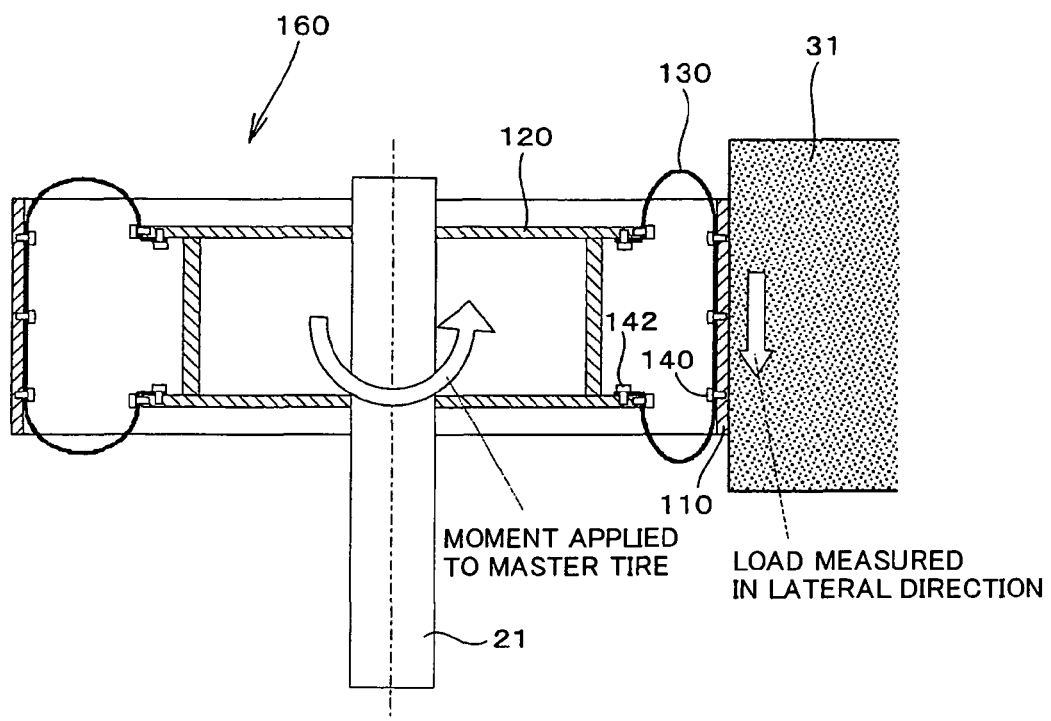
FIG. 5 is a view showing a state in which the master tire shown in FIG. 4 is pressed against the rotation drum.

FIG. 4 is a sectional view showing a master tire 160 according to this embodiment. This master tire 160 is configured so that the cylindrical member 110 is installed so as to be preliminarily inclined at a predetermined angle with respect to the spindle 21. Hence, the cylindrical member 110 tends to return to its horizontal position when pressed by the rotation drum 31 as shown in FIG. 5. At that time, a moment force is generated and a load balanced with the moment is generated in the lateral direction.

Since the above-mentioned moment changes as the master tire 160 rotates, the load in the lateral direction of the tire changes and appears as the LFV.

Figure 6:
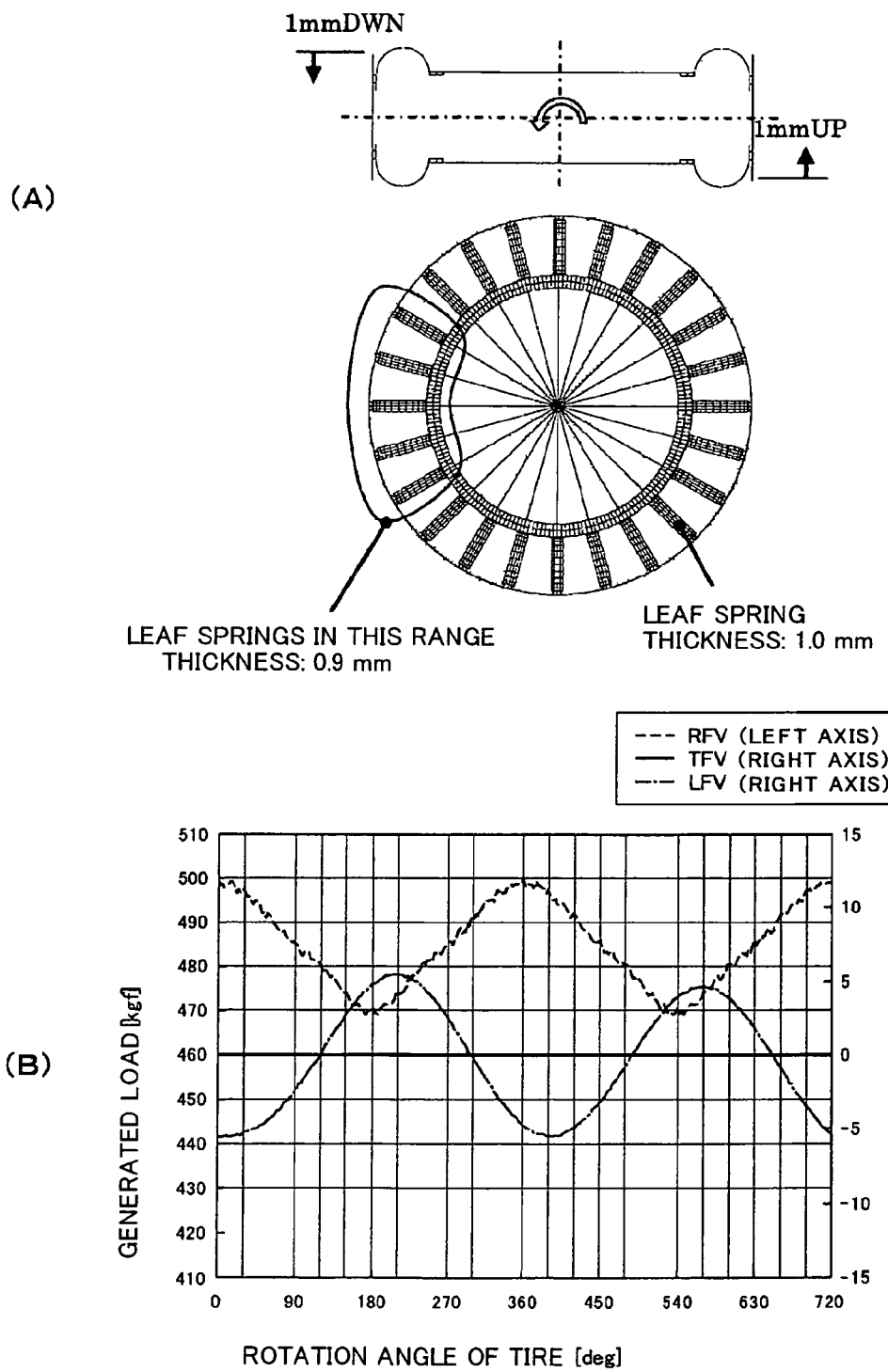
FIG. 6 is a view showing an analyzed example of the master tire according to the second embodiment.

FIG. 6 shows an example in which the master tire 160 according to this embodiment is analyzed using FEM. The cylindrical member 110 is made of aluminum, measuring 660 mm in outside diameter, 210 mm in height and 8 mm in thickness. The leaf spring 130 is made of spring steel, measuring 20 mm in width and 1 mm in thickness. As shown in FIG. 6(A), only five of the leaf springs 130 are 0.9 mm in thickness. The cylindrical member 110 is set at an inclination angle amounting to 1 mm and each member is modeled using shell elements. The master tire 160 is rotated twice in a state in which the rotation drum 31 having a diameter of 1200 mm is pressed against this model at a load of approximately 500 kgf.

As shown in FIG. 6(B), it can be confirmed that a load variation of approximately 30 kg is generated as the RFV and a load variation of 10 kg is generated as the LFV in the master tire 160.

As in the case of this embodiment, the concept of changing the rigidity of some of the leaf springs 130 and the concept of inclining the cylindrical member 110 equivalent to the tread portion can also be applied to a master tire (described later) according to a third embodiment.

The method for inspecting the accuracy of the tire tester 1 using the master tire 100 according to the above-mentioned first embodiment and the master tire 160 according to the above-mentioned second embodiment will herein be described. The following will be described assuming that the master tire according to the second embodiment is used.

The load variation components, the RFV and the LFV, corresponding to the rotation of the master tire are generated by changing the rigidity of some of the leaf springs of the master tire 160 and by inclining the cylindrical member 110 equivalent to the tread portion. The master tire 160 is secured accurately to the spindle 21 of the tire tester 1. This securing is carried out by fitting the spindle 21 into the fitting portion of the master tire 160. Then, as in the case of the ordinary tire. T, the rotation drum 31 is pressed against the master tire 160 to rotate it at a predetermined rotation speed and the loads are measured.

Furthermore, it is also possible to carry out measurements while the phase relationship between the master tire 160 and the spindle 21 is changed multiple times. Variations in measured values and repeatability thereof are confirmed, and an accuracy inspection method determined separately is applied to make judgments. Measurements are carried out while the phase relationship between the master tire 160 and the spindle 21 is changed at least twice, and the variations are evaluated according to the standard deviation.

Specifically speaking, the accuracy inspection is carried out according to the following procedure.

(Step a) The master tire 160 is set in the tire tester 1 according to the above-mentioned method.

(Step b) The rotation drum 31 is pressed against the master tire 160 until the predetermined load is generated.

(Step c) The inter-axis distance between the spindle 21 and the rotation drum shaft 32 is fixed.

(Step d) The load RF in the radial direction and the load LF in the lateral direction are measured.

(Step e) While the inter-axis distance between the spindle 21 and the rotation drum shaft 32 is fixed, the spindle 21 is rotated slightly (for example, 10°) to change the contact position between the master tire 160 and the rotation drum 31.

(Step f) Steps d to e are repeated, and measurements for 72 phases (two rotations) of the master tire 160 are carried out to confirm data reproducibility.

(Step g) The RF and the LF are plotted to obtain the RFV and the LFV.

The results (the average values and the standard deviation values of the RFV and the LFV) obtained in this way are assumed to be the representative characteristic values of the tire tester 1.

Since the master tire according to this embodiment has a structure formed by the combination of the cylindrical member simulating the tread portion and the leaf springs, the rigidities in the radial direction and in the lateral direction are equivalent to those of the tire to be tested. Since a metallic material or the like is used, the effects of external environment, such as temperature, are scarce, and change with time due to repeated use does not occur. Furthermore, accurate and secure installation in the tire tester is made possible, and an accuracy inspection free from the effects of fitting can be carried out.

Third Embodiment

Next, a master tire according to a third embodiment will be described. The master tire according to this embodiment is suited for such a tire tester 51 as shown in FIG. 7.

Figure 7:
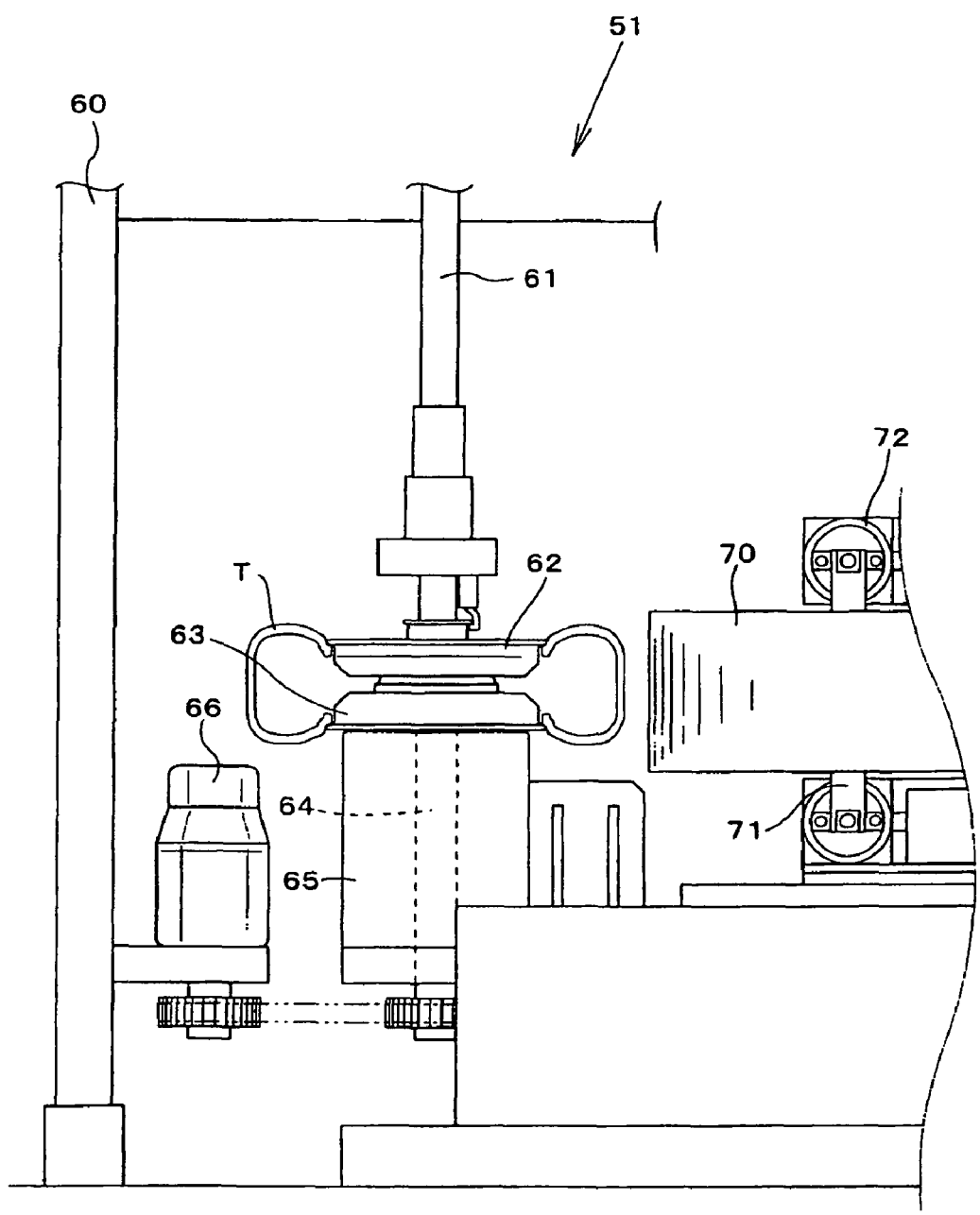
FIG. 7 is a view showing the entire configuration of a tire tester subjected to accuracy inspection using a master tire according to a third embodiment.

As shown in FIG. 7, this tire tester 51 is equipped with a main frame 60 constructed in a gate shape on the floor. The main frame 60 is equipped with an upper shaft 61 being extendable and retractable in the vertical direction by virtue of a lifting mechanism, not shown, and an upper rim 62 removably provided at the lower end of the upper shaft 61. A lower rim 63 for holding the tire T in cooperation with the upper rim 62 is provided below the upper rim 62.

A spindle 64 is rotatably supported on a spindle housing secured to the main frame 60 so as to be relatively rotatable with respect to the spindle housing 65 by the driving of a motor 66. A rotation drum 70 is provided on the side of the spindle 64 so as to be driven and rotated, and the rotation drum 70 can make contact with the tire T held on the spindle 64. The upper rim 62 is formed into a disc shape, and the intermediate portion of the upper rim 62 in the vertical direction has an outside diameter suited for the inside diameter of the tire T. This intermediate portion is configured so as to be inserted into the inside of the tire T from above.

The rotation drum 70 is rotatably supported on a shaft portion 71 extending therefrom upward and downward. The shaft portion 71 is provided with load sensors 72 for measuring the force transmitted from the tire T via the rotation drum 70.

Next, a master tire 200 according to this embodiment will be described. This master tire 200 is particularly suited for the tire tester 51 of a vertically divided rim type.

Figure 8:
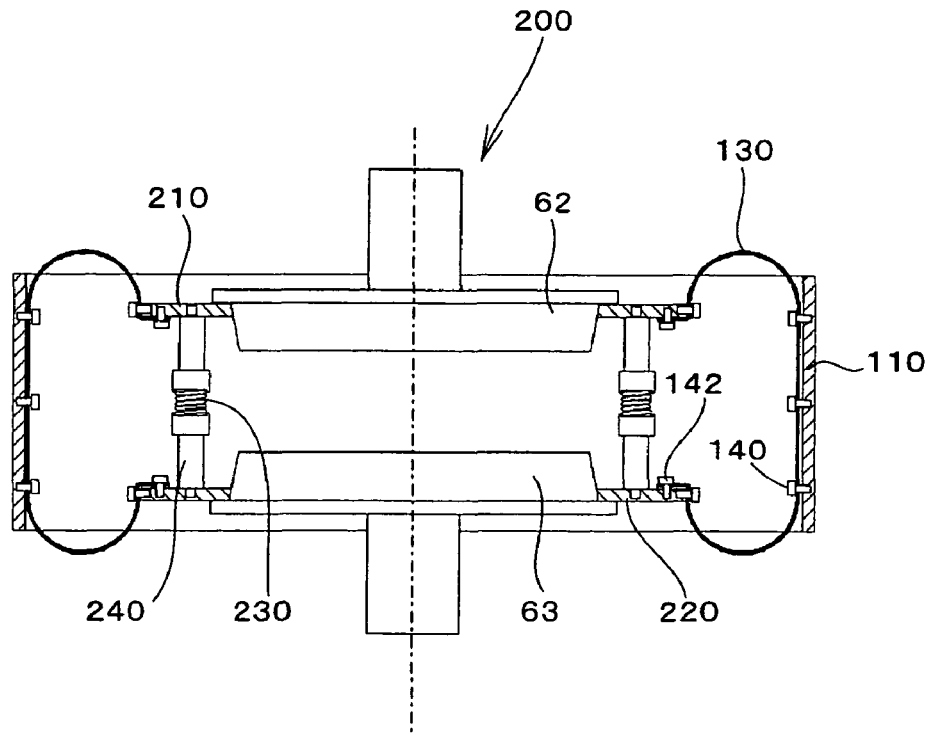
FIG. 8 is a view showing the configuration of the master tire according to the third embodiment.

FIG. 8 is a sectional view showing the master tire 200. The master tire 200 has a pair of upper and lower rim members 210 and 220 installed on the spindle 62; a plurality of elastic connection members 230 for connecting the pair of upper and lower rim members 210 and 220; and the cylindrical member 110 made of a material having elastic characteristics more stable than those of the tire T and simulating the tread portion of the tire T. Furthermore, the master tire 200 has the plurality of elastic members 130 made of a material having elastic characteristics more stable than those of the tire T. The plurality of elastic members 130 are distributed circumferentially between the cylindrical member 110 and the rim members 210 and 220.

The tire tester 51 of the divided rim type is a tester capable of dealing with various kinds of tires having different widths. Since the upper rim 62 and the lower rim 63 each have a structure capable of being raised and lowered and can hold the tire T therebetween, the tire T can be mounted on the rims easily and quickly. When the tire T is inflated with air, the tire T is securely connected to the rims and held therewith by virtue of internal pressure.

However, when the master tire 200 is mounted on the rims of the tire tester 51, the mounting using internal pressure in the case of a pneumatic tire is impossible. Hence, the compression coil springs 230 serving as elastic connection members are mounted between the upper rim member 210 and the lower rim member 220 of the master tire 200, instead of applying internal pressure, so that a reaction force is generated depending on the approach distance between the upper and lower rims of the tire tester 51. The compression coil spring 230 is mounted on the upper rim member 210 and the lower rim member 220 using spring mounting members 240.

After the master tire 200 is set on the lower rim 63 of the tire tester 51, the upper rim 62 of the tire tester 51 is lowered, whereby the master tire 200 is set. The rigidity and length of the compression coil spring 230 are designed so that a load by which the rims of the master tire 200 are completely held with the rims of the tire tester 51 is generated at a predetermined distance between the rims of the tire tester 51.

In the tire tester 51, errors occur in the measured values of the RFV, the LEV, etc. due to the misalignment and inclination of the axial centers of the upper and lower rims. The master tire 200 shown in FIG. 8 has a structure in which the upper and lower rims being divided are connected to each other using the compression coil springs 230. With this structure, as shown in FIG. 9, the deformed state of the master tire 200 becomes similar to that of an actual pneumatic tire, whereby the accuracy inspection of the tire tester 51 can be carried out securely while the effect of the misalignment of the axial centers is reflected.

Figure 9:
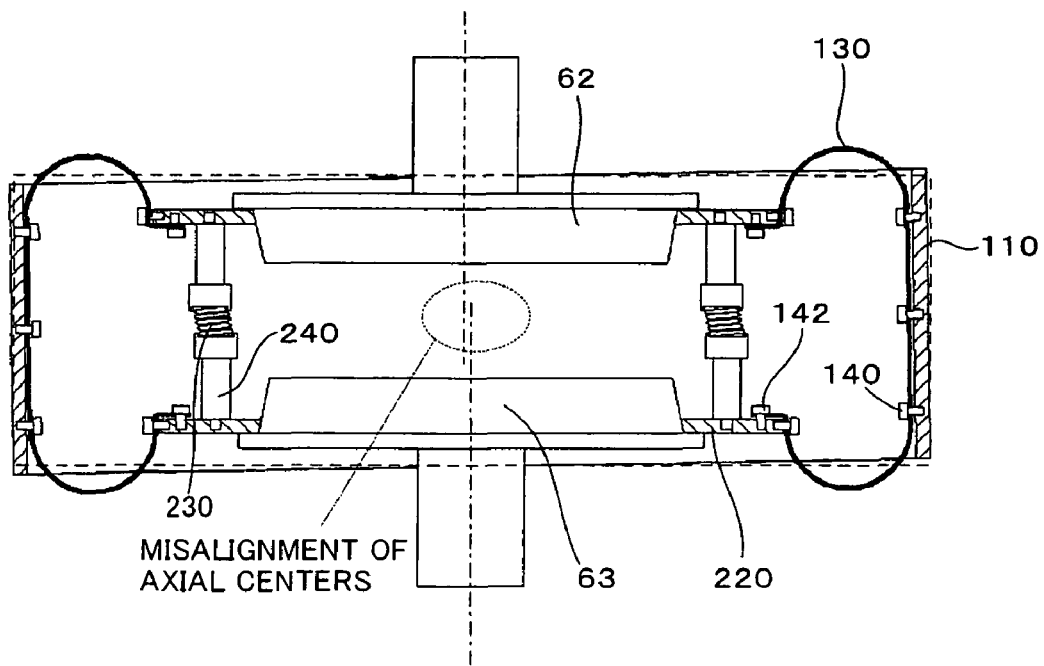
FIG. 9 is a view showing the configuration of the master tire according to the third embodiment (the axial centers being misaligned)

In other words, in the case that the master tire 100 according to the first embodiment is used, "the misalignment of the axial centers of the upper and lower rims" shown in FIG. 9 is suppressed and cannot be reproduced, and an erroneous accuracy inspection may be carried out in the tire tester 51. However, when the master tire 160 according to this embodiment is used, "the true accuracy of the tire tester 51" can be measured while the misalignment of the axial centers remains.

Fourth Embodiment

Next, a fourth embodiment according to the present invention will be described. This embodiment relates to the static inspection of the master tire itself and to the accuracy inspection of a tire tester using the results thereof. This embodiment will be described assuming that the master tire according to the first embodiment is used.

Since it is assumed that a low-speed (for example, a rotation speed of 60 rpm) tire uniformity tester is less influenced by dynamic effects, such as centrifugal force, the characteristics of the master tire 100 are obtained beforehand by carrying out the static test, and the measurement accuracy of the tire uniformity tester is evaluated using the obtained values.

In particular, an apparatus having a single-axis cylinder is used for the static test of the master tire 100. In this apparatus, the axial center of the master tire 100 is secured using a dedicated jig and displaced by a predetermined amount in the vertical direction, and the load generated at the time is measured.

Figure 10:
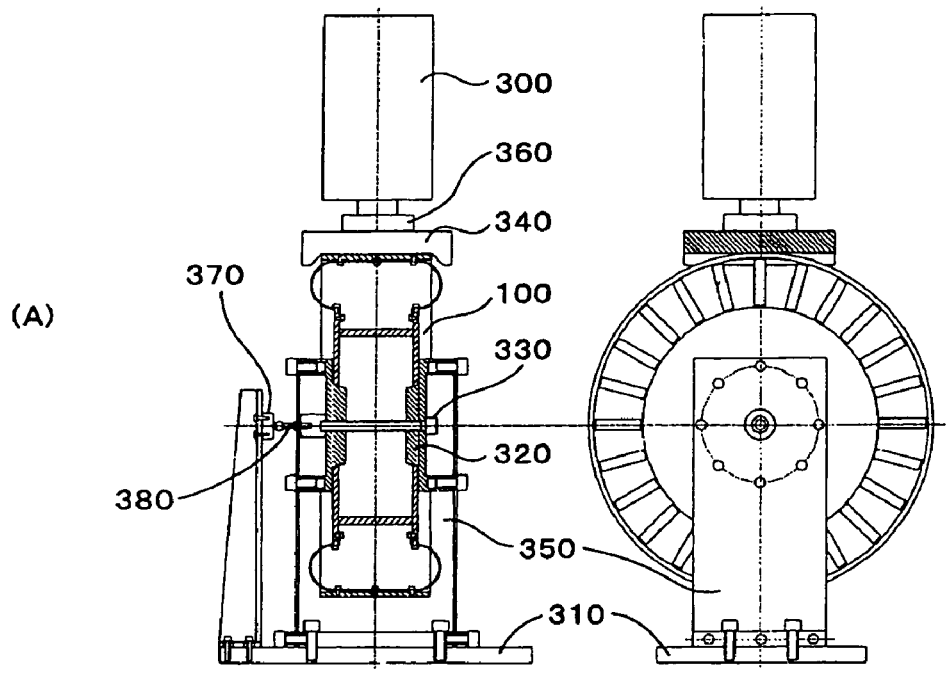
FIG. 10 is a view showing the entire configuration of an apparatus for carrying out the static test of the master tire.
Figure 10:
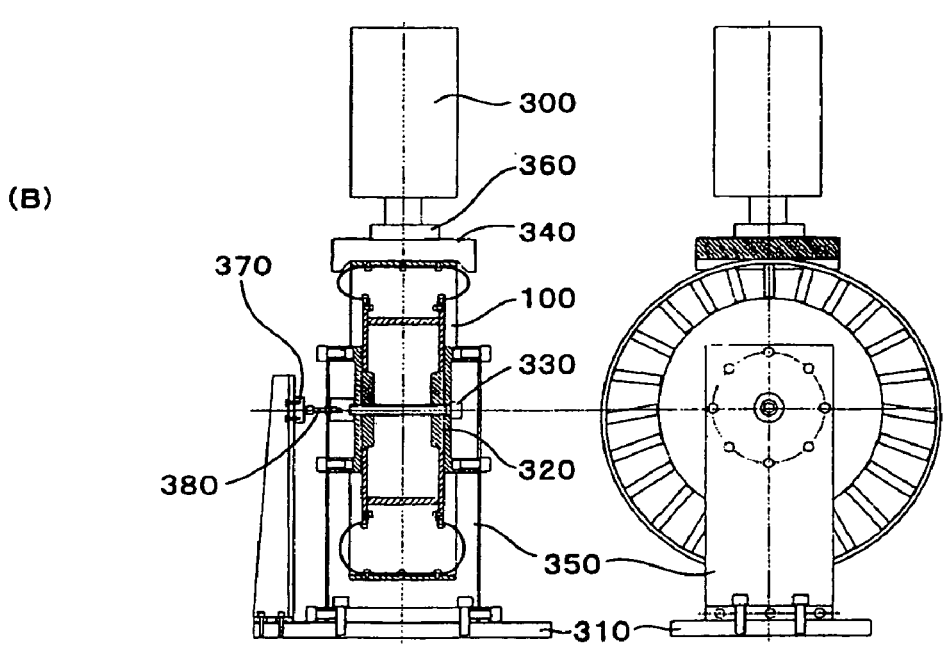

As shown in FIG. 10(A), in this static tester, the master tire 100 is secured in the vertical direction, and a load is applied from above using a single-axis jack 300. The pressing plate 340 installed at the tip of the jack 300 is provided with a guide so that the position of the tire in the lateral direction is fixed. This simulates that even if the cylindrical member 110 of the master tire 100 is installed in an inclined state, in the case that it is rotated by the rotation drum of the tire tester, it is maintained and rotated at a constant position where it is balanced in the lateral direction by the restraining force of friction.

An RF load cell 360 for measuring the RF is disposed above the pressing plate 340, and an LF load cell 370 for measuring the LF is disposed on the side of the master tire 100 in the lateral direction thereof. An RF reaction force plate 350 is formed of a thin plate so as not to restrain the load in the lateral direction of the tire. Since the RF reaction force plate 350 can be bent and deformed while supporting the RF load, the load in the lateral direction can be measured using the LF load cell 370 via an LF transmission pin 380.

The method for measuring the static characteristics of the master tire 100 in this apparatus will be described. Measurement is carried out according to the following procedure.

(Step A) The master tire 100 is set in this apparatus. The master tire 100 is restrained so as not to rotate by tightening a fixing bolt 330.

(Step B) The jack 300 is extended until a predetermined load is generated to press the pressing plate 340 against the master tire 100.

(Step C) The displacement of the jack 300 is measured and the displacement is defined as a pressing reference displacement x0.

(Step D) The load RF in the radial direction and the load LF in the lateral direction are measured, and the jack 300 is retracted to separate the pressing plate 340 from the master tire 100.

(Step E) The fixing bolt 330 is loosened and the master tire 100 is slightly rotated (for example, 10°) to change the contact position between the master tire 100 and the pressing plate 340.

(Step F) The jack 300 is extended until the displacement thereof becomes x0.

(Step G) The 72 phases (two rotations) of the master tire 100 are measured by repeating Steps D to F to confirm the reproducibility of data.

(Step H) The RF and the LF are plotted to obtain the static RFV and the static LFV.

The characteristics (the average values and standard deviation values of the RFV and the LFV) of the master tire 100 obtained by the static test carried out in this way are used as representative values (static RFV and static LFV).

On the other hand, the RFV and the LFV are measured using a tire tester for carrying out an accuracy inspection while the master tire 100 subjected to the above-mentioned static test is rotated at a predetermined rotation speed. The accuracy inspection is carried out by comparing the measured RFV and LFV with the representative values (static RFV and static LFV) of the master tire 100 obtained by the static test.

For example, during a test in which the rotation speed is low and the effects of centrifugal force can be ignored, in the case that the RFV and the LFV measured using the tire tester are nearly equal to the static RFV and the static LFV, it can be judged that the accuracy of the tire tester is very high. Conversely, in the case that the RFV and the LFV measured using the tire tester are significantly different from the static RFV and the static LFV, it can be judged that some errors are included in the measured values of the tire tester.

The present invention may be applied as the following modified examples.

For example, the RFV and the LFV of the master tire are measured by a plurality of tire testers of different types, and their average values are used as the fundamental characteristics of the master tire. It may be possible that the fundamental characteristics are compared with the measurement results of the RFV and the LFV measured by the tire tester that should be subjected to the accuracy inspection to evaluate the tire tester.

In other words, the dynamic variable loads of the master tire are obtained by using the plurality of tire testers, and the average values and the standard deviation values of all the experiment data are used as the representative values of the characteristics of the master tire. Data can be stored by continuing the accuracy inspections of the tire testers using the master tire, and the accuracy inspections can be carried out more accurately by utilizing the data.

Master tires formed by arbitrarily combining the above-mentioned plurality of embodiments are also included within the scope of the present invention.

The embodiments disclosed herein are examples in all respects and should not be considered to be restrictive. The scope of the present invention is to be construed in view of the scope of claims, not by the above-mentioned description, and the scope of the present invention includes equivalents to the scope of claims and all modifications made within the scope of claims.

Although the present invention has been explained in detail as described above with reference to specific embodiments thereof, it is obvious to those skilled in the art that the present invention is susceptible of various changes and modifications without departing from the spirit and scope of the present invention. The present application is based on Japanese Patent Application (Patent Application No. 2008-192185) filed on Jul. 25, 2008, the contents of which are incorporated herein by reference.

EXPLANATIONS OF LETTERS AND NUMERALS 1, 51 tire tester
2 tire rolling device
3 drum device
21, 64 spindle
62 upper rim
63 lower rim
100 master tire
110 cylindrical member
120 rim member
130 leaf spring 140 bolt
142 bolt
160 master tire
200 master tire
230 compression coil spring
240 spring mounting member
T tire

The invention claimed is:

1. A master tire for inspecting a measurement accuracy of a tire uniformity tester equipped with a spindle on which a tire is mountable and a drum mechanism for pressing a rotatable drum against the outer circumference of the tire, comprising:
   a rim member adapted for reversible installation on said spindle;
   a cylindrical member made of a material having elastic characteristics more stable than those of a vulcanizate and simulating the tread portion of the tire; and
   a plurality of elastic members made of a material having elastic characteristics more stable than those of the vulcanizate and distributed and provided between the cylindrical member and the rim member in the circumferential direction of the cylindrical member.

2. A master tire for inspecting a measurement accuracy of a tire uniformity tester equipped with a spindle on which a tire is mountable and a drum mechanism for pressing a rotatable drum against the outer circumference of the tire, comprising:
   a pair of upper and lower rim members installed on the spindle;
   a plurality of elastic connection members for connecting the pair of upper and lower rim members;
   a cylindrical member made of a material having elastic characteristics more stable than those of a vulcanizate and simulating the tread portion of the tire; and
   a plurality of elastic members made of a material having elastic characteristics more stable than those of the vulcanizate and distributed and provided between the cylindrical member and the rim member in the circumferential direction of the cylindrical member.

3. The master tire according to claim 1, wherein the cylindrical member and the elastic members are made of materials having aging characteristics more stable than those of the vulcanizate.

4. The master tire according to claim 1, wherein the plurality of elastic members include leaf springs made of a metal.

5. The master tire according to claim 1, wherein the plurality of elastic members have rigidities different in the circumferential direction.

6. The master tire according to claim 1, wherein a center axis of the cylindrical member is inclined with respect to the spindle.

7. A method for inspecting a tire uniformity tester, comprising the steps of:
   providing a tire uniformity tester equipped with a spindle on which a tire is mountable;
   providing a drum mechanism for pressing a rotatable drum against the outer circumference of a tire;
   providing a master tire comprising a rim member, a cylindrical member made of a material having elastic characteristics more stable than those of a vulcanizate and simulating the tread portion of the tire, and a plurality of elastic members made of a material having elastic characteristics more stable than those of the vulcanizate and distributed and provided between the cylindrical member and the rim member in the circumferential direction of the cylindrical member;
   mounting said master tire on said spindle;
   inspecting a measurement accuracy of the tire uniformity tester using the master tire.

8. The method for inspecting the tire uniformity tester according to claim 7, wherein the measurement accuracy is inspected on a basis of the results of measurements carried out while a phase relationship between the master tire and the spindle is changed at least twice.

9. The method for inspecting the tire uniformity tester according to claim 7, wherein:
   the force variation in the radial direction of the master tire and the force variation in the lateral direction of the master tire at the time when a static load is applied to the master tire are obtained; and
   the measurement accuracy is inspected on the basis of the force variation in the radial direction of the master tire and the force variation in the lateral direction of the master tire.

10. The master tire according to claim 2, wherein the cylindrical member and the elastic members are made of materials having aging characteristics more stable than those of the vulcanizate.

11. The master tire according to claim 2, wherein the elastic members include leaf springs made of a metal.

12. The master tire according to claim 2, wherein the plurality of elastic members have rigidities different in the circumferential direction.

13. The master tire according to claim 2, wherein the center axis of the cylindrical member is inclined with respect to the spindle.

14. A method for inspecting a tire uniformity tester, comprising the steps of:
   providing a tire uniformity tester equipped with a spindle onto which a pair of upper and lower rim members can be installed for mounting a tire;
   providing a drum mechanism for pressing a rotatable drum against the outer circumference of the tire;
   providing a master tire comprising a pair of upper and lower rim members, a plurality of elastic connection members for connecting the pair of upper and lower rim members, a cylindrical member made of a material having elastic characteristics more stable than those of a vulcanizate and simulating the tread portion of the tire, and a plurality of elastic members made of a material having elastic characteristics more stable than those of the vulcanizate and distributed and provided between the cylindrical member and the rim member in the circumferential direction of the cylindrical member;
   installing said pair of upper and lower rim members on said spindle;
   mounting said master tire on said pair of upper and lower rim members;
   measuring the accuracy of the tire uniformity tester using the master tire.

15. The method for inspecting the tire uniformity tester according to claim 14, wherein the measurement accuracy is inspected on a basis of the results of measurements carried out while a phase relationship between the master tire and the spindle is changed at least twice.

16. The method for inspecting the tire uniformity tester according to claim 14, wherein:
   obtaining a force variation in a radial direction of the master tire and a force variation in a lateral direction of the master tire at the time when a static load is applied to the master tire; and
   inspecting a measurement accuracy on a basis of the force variation in the radial direction of the master tire and the force variation in the lateral direction of the master tire.

* * * * *

UNITED STATES PATENT AND TRADEMARK OFFICE
CERTIFICATE OF CORRECTION

PATENT NO. : 8,082,779 B2  Page 1 of 1
APPLICATION NO. : 12/737540
DATED : December 27, 2011
INVENTOR(S) : Okada et al.

It is certified that error appears in the above-identified patent and that said Letters Patent is hereby corrected as shown below:

On the title page, please amend item (73) as follows:

Please delete:
"Kobe Steel Ltd."

and please add:

"KABUSHIKI KAISHA KOBE SEIKO SHO (KOBE STEEL, LTD.)"

Signed and Sealed this
Nineteenth Day of June, 2012

David J. Kappos
*Director of the United States Patent and Trademark Office*